United States Patent
Berger et al.

(10) Patent No.: US 8,347,734 B2
(45) Date of Patent: Jan. 8, 2013

(54) METHOD AND MEASURING SYSTEM FOR DETERMINING AND/OR MONITORING FLOW OF A MEASURED MEDIUM IN A MEASURING TUBE

(75) Inventors: Andreas Berger, Hasel-Glashutten (DE); Finn Bloch Jensen, Basel (CH); Ralf Sonderkamp, Jar (NO); Achim Wiest, Weil am Rhein (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 96 days.

(21) Appl. No.: 12/999,693

(22) PCT Filed: Jun. 2, 2009

(86) PCT No.: PCT/EP2009/056731
§ 371 (c)(1),
(2), (4) Date: Dec. 17, 2010

(87) PCT Pub. No.: WO2009/156250
PCT Pub. Date: Dec. 30, 2009

(65) Prior Publication Data
US 2011/0094309 A1    Apr. 28, 2011

(30) Foreign Application Priority Data
Jun. 25, 2008    (DE) .......................... 10 2008 029 772

(51) Int. Cl.
*G01F 1/66*    (2006.01)

(52) U.S. Cl. .................................................. 73/861.28
(58) Field of Classification Search ............... 73/861.25, 73/861.28, 861.26
See application file for complete search history.

(56) References Cited

U.S. PATENT DOCUMENTS

| | | | |
|---|---|---|---|
| 4,882,934 A | 11/1989 | Leffert | |
| 5,650,572 A * | 7/1997 | Vontz .......................... | 73/861.28 |
| 7,448,282 B2 * | 11/2008 | Wiest et al. ................. | 73/861.28 |
| 2003/0233860 A1 | 12/2003 | Deane | |
| 2004/0127793 A1 | 7/2004 | Mendlein | |
| 2008/0022776 A1 | 1/2008 | Buchanan | |

FOREIGN PATENT DOCUMENTS

| | | |
|---|---|---|
| DE | 101 18 934 A1 | 10/2002 |
| DE | 102 21 771 A1 | 11/2003 |
| DE | 102 30 607 A1 | 2/2004 |
| DE | 102 58 997 A1 | 6/2004 |

(Continued)

*Primary Examiner* — Jewel V Thompson
(74) *Attorney, Agent, or Firm* — Bacon & Thomas, PLLC

(57) ABSTRACT

A measuring system and method for determining and/or monitoring the flow of a measured medium through a measuring tube with a first ultrasonic sensor and at least a second ultrasonic sensor. The first Ultrasonic sensor is placeable in a first region of the measuring tube, and the second ultrasonic sensor is placeable in a second region of the measuring tube. The ultrasonic signals transmittable through the measured medium from the first ultrasonic sensor are receivable by the second ultrasonic sensor, and the ultrasonic signals transmittable through the measured medium from the second ultrasonic sensor are receivable by the first ultrasonic sensor. A control/evaluation unit ascertains the volume flow and/or the mass flow of the measured medium flowing in the measuring tube by means of a travel-time difference method.

13 Claims, 5 Drawing Sheets

FOREIGN PATENT DOCUMENTS

| | | |
|---|---|---|
| DE | 102 55 698 A1 | 7/2004 |
| DE | 103 44 895 A1 | 4/2005 |
| DE | 10 2005 024 134 A1 | 1/2007 |
| WO | WO 2005/031368 A2 | 4/2005 |
| WO | WO 2005/031368 A2 | 4/2005 |
| WO | WO 2007/033911 A2 | 3/2007 |

* cited by examiner

METHOD AND MEASURING SYSTEM FOR DETERMINING AND/OR MONITORING FLOW OF A MEASURED MEDIUM IN A MEASURING TUBE

TECHNICAL FIELD

The present invention relates to a method for determining and/or monitoring flow of a measured medium through a measuring tube with a first ultrasonic sensor and at least a second ultrasonic sensor, The first ultrasonic sensor has at least one electromechanical ultrasound transducer element and is placed in a first region of the measuring tube, and the second ultrasonic sensor has at least two electromechanical ultrasound transducer elements and is placed in a second region of the measuring tube in such a manner, that the ultrasonic signals transmitted through the measured medium from the first ultrasonic sensor are received by the second ultrasonic sensor, and that the ultrasonic signals transmitted through the measured medium from the second ultrasonic sensor are received by the first ultrasonic sensor and with at least one control/evaluation unit, which, on the basis of the ultrasonic measuring signals, or on the basis of measurement data which, are derived from the ultrasonic measuring signals, ascertains volume flow and/or mass flow of the measured medium flowing in the measuring tube by means of a travel-time difference method. The invention relates, as well, to a corresponding measuring system. The terms "tube" and "pipe" are used interchangeably herein. An example of volume flow is volume flow rate, and an example of mass flow is mass flow rate.

BACKGROUND DISCUSSION

Ultrasonic flow measuring devices are often utilized in the field of process and automation technology. They permit simple determination of volume flow and/or mass flow in a pipeline.

Known ultrasonic flow measuring devices work frequently on the basis of the Doppler principle or on the basis of the travel-time difference principle.

In the case of the travel-time difference principle, the different travel times of ultrasonic pulses in and counter to the flow direction of the liquid are evaluated.

For this, ultrasonic pulses are transmitted at a certain angle to the tube axis both with and counter to the flow. From the travel-time difference, the flow velocity, and, therewith, with knowledge of the diameter of the section of pipeline, the volume flow can be determined.

In the case of the Doppler principle, ultrasonic waves with a certain frequency are coupled into the liquid, and the ultrasonic waves reflected by the liquid are evaluated. From the frequency shift between the coupled-in and reflected Waves, the flow velocity of the liquid likewise can be determined.

Reflections occur in the liquid, however, only when small air bubbles or impurities are present, so that this principle mainly finds application in the case of contaminated liquids.

Ultrasonic waves are produced or received with the help of so-called ultrasonic transducers. For this, ultrasonic transducers are fixedly applied on the pipe wall of the pipeline section of concern. More recently, clamp-on ultrasonic flow measuring systems have also become available. In the case of these systems, the ultrasonic transducers are, essentially, just pressed on the pipe wall with a clamp. Such systems are known e.g. from EP 686 255 B1, U.S. Pat. No. 4,484,478 or U.S. Pat. No. 4,598,593.

A further ultrasonic flow measuring device, which works according to the travel-time difference principle, is known from U.S. Pat. No. 5,052,230. The travel time is ascertained, in this case, by means of short, ultrasonic pulses.

A large advantage of clamp-on ultrasonic flow measuring systems is that they do not contact the measured medium, and can be placed on an already existing pipeline. Disadvantageous is the greater effort in the mounting of the clamp-on systems, in order to align the individual ultrasonic transducers relative to one another, this depending on many parameters, such as, for example, pipe wall thickness, pipe diameter, and velocity of sound in the measured medium.

Ultrasonic transducers are composed, normally, of an electromechanical transducer—in industrial process measurements technology, most often, a piezoceramic—and a coupling layer, also referred to as "coupling wedge" or, less frequently, "lead-in element". The coupling layer is, in such case, most often made of synthetic material, or plastic. The ultrasonic waves are produced in the electromechanical transducer element, guided via the coupling layer to the pipe wall, and, from there, conducted into the liquid. Since the sound velocities in liquids and synthetic materials, or plastics, differ, the ultrasonic waves are refracted at the transitions from one medium to another. The angle of refraction is determined, to a first approximation, by Snell's law. In accordance therewith, the angle of refraction depends on the ratio of the propagation velocities in the media.

Between the piezoelectric element and the coupling layer, an additional coupling layer can be arranged, a so-called adapting, or matching, layer. The adapting layer assumes the function, in such case, of transmitting the ultrasonic signal and, simultaneously, reducing reflection caused at the interfaces by different acoustic impedances of the adjoining materials.

In numerous sources, e.g. in DE 10 2006 029 199 B3, the flow velocity of a measured medium in a measuring tube is ascertained via dispersion of an ultrasonic signal by the flow of the measured medium in the measuring tube.

In WO 2007/039394 A2, an ultrasonic flow measurement device is described, wherein the device has at least one ultrasonic transducer in a first region of the measuring tube, and at least two ultrasonic transducers in a second region. Due to the difference in the distances of the transducers in the second region to the transducer in the first region, there results a travel time difference for the ultrasonic signals. This travel time difference is taken into consideration for calculating the flow. A disadvantage is that the ultrasonic transducer in the first region of the measuring tube must produce an energy intensive signal with a high signal strength and broad signal aperture angle in order for the signal to reach the two other ultrasonic transducers in the second region of the measuring tube.

DE 102 21 771 A1 shows an ultrasonic sensor for an ultrasonic flow measurement device having a plurality of piezo elements, which are combined to form a so-called piezo array, wherein the piezo elements are operable in a time-delayed manner. In this way, with an ultrasonic sensor placed flat on the measuring pipe wall, it is possible to obtain different angles of the ultrasonic signal radiated into the measured medium with a wavefront relative to the measuring tube axis. The time-delayed activating is, however, very computationally intensive. Also, the changing of the angle is only feasible in a limited region. If the ultrasonic signal is radiated in a very flat manner, an exciting of longitudinal waves can occur, and the transmission through the pipe wall is lessened, and a significant part of the sound wave is reflected.

SUMMARY OF THE INVENTION

An object of the invention is to provide a method and a corresponding flow measuring system whose sensors are placeable on a pipeline and do not require a complicated alignment relative to one another.

The object is achieved by a method for determining and/or monitoring flow of a measured medium through a measuring tube with a first ultrasonic sensor and at least a second ultrasonic sensor, wherein the first ultrasonic sensor has at least one electromechanical ultrasound transducer element and is placed in a first region of the measuring tube, and wherein the second ultrasonic sensor has at least two electromechanical ultrasound transducer elements and is placed in a second region of the measuring tube in such a manner, that ultrasonic signals transmitted through the measured medium from the first ultrasonic sensor are received by the second ultrasonic sensor, and that ultrasonic signals transmitted through the measured medium from the second ultrasonic sensor are received by the first ultrasonic sensor, and with at least one control/evaluation unit, which, on the basis of the ultrasonic measuring signals, or on the basis of measurement data, which are derived from the ultrasonic measuring signals, ascertains volume flow and/or mass flow of the measured medium flowing in the measuring tube by means of a travel-time difference method, wherein, during a diagnostic phase, ultrasonic signals are transmitted from the first ultrasonic sensor through the measured medium to the second ultrasonic sensor, and at least one process variable is ascertained and/or derived from the received ultrasonic signals for each electromechanical ultrasonic transducer element of the second ultrasonic sensor, and the electromechanical ultrasonic transducer elements of the second ultrasonic sensor which are to be active in a following measuring phase are selected based on the process variable of the received ultrasonic signals. Thus, a distinction is drawn between a diagnostic phase and a measuring phase. In the diagnostic phase, the ultrasonic transducer elements are determined, which, during the measuring phase, transmit and/or receive ultrasonic signals for measuring.

Usually, ultrasonic sensors have coupling elements, which effect an angle between the ultrasonic transducer elements placed thereon and the principal flow direction of the measured medium in the measuring tube, which, most often, extends approximately aligned with the central axis of the measuring tube. The ultrasonic signal between the sensors thus receives a directional component in and/or counter to the principal flow direction of the measured medium in the measuring tube. In certain forms of conditioned flow, an ultrasonic signal can be radiated perpendicularly to the pipe wall or tube axis, yet the flow can nevertheless be ascertained by means of the travel-time difference method.

The sensors are mounted or installed in various regions of the measuring tube. In the case of clamp-on systems, the sensors are externally placed on oppositely lying sides of the measuring tube outer wall, or they are located on the same side of the measuring tube, and the signal is reflected on the side of the measuring pipe wall lying opposite the sensors, preferably by means of a reflector on the inner side of the measuring tube. In the case of inline-systems, the sensors are most often located at fixed locations, either firmly in the measuring pipe wall or connected therewith.

The process variables ascertained during the diagnostic phase are, especially, the signal strength of the received ultrasonic signal, its amplitude, its phase relationship, the envelope or the transfer function. Derivable variables are, for example, the intensity or the travel time of the ultrasonic signal.

The electromechanical ultrasonic transducer element is preferably a piezoelectric element. There also exist, however, electrostrictive and/or magnetostrictive elements which are able to produce and/or to receive suitable ultrasonic signals.

A first ultrasonic sensor having at least one electromechanical ultrasonic transducer element is placed in a first region the measuring tube. Relative to this, a second ultrasonic sensor is placed in a second region of the measuring tube. In the case of clamp-on systems, the two sensors are externally secured on the measuring pipe wall. The sensors are roughly aligned with one another, i.e. their distance is roughly (or in rough steps) set according to a particular specification, e.g. at intervals of the size of the diameter of the measuring tube. The effort required for this system is very small in comparison to the state of the art.

By changing the measured medium parameters, e.g. the measured medium itself or its temperature, the angle of refraction of the ultrasonic signals, among other things, also changes. This would, in the state of the art, require a new alignment of the sensors with respect to one another. Alternatively, the signal intensity for determining the flow would be lower, and/or the measurement results would be burdened with a greater degree of error.

Here, however, the optimal combination of ultrasonic transducer elements for the sensors for the measuring is determined. Even a non-optimal combination can be used for the measuring; however, then the measuring is burdened with a greater degree of uncertainty.

During the diagnostic phase, exactly one ultrasonic transducer element (e.g. alternatingly) sends out ultrasonic signals. The parameters ascertained and/or derived from the received ultrasonic signals are individually determined for the receiving ultrasonic transducer elements. This can occur in only one direction, i.e. from the first to the second ultrasonic sensor. Alternatively thereto, ultrasonic signals can enter into the diagnosis in both directions, upstream and downstream, since a phase shift between the signal with a directional component in the principal flow direction of the measured medium in the measuring tube and the ultrasonic signal with a directional component counter to the principal flow direction of the measured medium in the measuring tube is evaluatable.

The diagnostic phase then involves ascertaining and/or deriving the process variables of all possible combinations of ultrasonic transducer elements in the two directions. Thus, at the end of this phase, a data set is present with a description of the measurement results of all combinations during the diagnostic phase. On the basis of the desired process variables, the best possible combination is then selected, and the process variables are stored as reference values. These are then always available for comparison with a current measuring.

The actual measuring begins only after establishing the sensors to be active for the measuring. The diagnostic phase is possible before and after each measuring; however, the selection of the electromechanical ultrasonic transducer elements to be active in the following measuring phase can also occur during a measuring phase. By means of other transmitting frequencies and/or other pulse sequences, this selection is, for example, possible, without disturbing the measurement operation. Since a flow measuring occurs via evaluation of individual ultrasonic packets, either these measurements can be directly compared with the stored reference parameters, or one or more measurements for diagnosis occur between two packets of the flow measurement.

Through this arrangement, the velocity of sound in the measured medium can additionally be easily determined. In the case of a known measured medium, its temperature can thus be deduced, or, in the case of known temperature, a change in the measured medium can thus be detected.

Other strategies for accelerated diagnosis are based, among other things, on the idea that not all combinations of ultrasonic transducer elements are measured. In the case of two ultrasonic sensors with very many transducer elements, it is possible to select the combination with the smallest distance perpendicular to the tube axis to one another, the combination with the largest distance perpendicular to the tube axis to one another, and an intermediate combination. The distances are then interatively halved on the side of the more favorable process variables.

The diagnosis can take place both in the case of flowing measured medium, as well as also in the case of so-called zero flow, i.e. in the case of a non-moving measured medium in the measuring tube. Advantageously, the diagnosis is performed with the measured medium flowing the measuring tube, since, in such case, a disturbance signal (e.g. brought about by a so called tube wave, that is an ultrasonic signal in the measuring tube itself or in the measuring pipe wall) is better distinguishable from the wanted signal, i.e. from the ultrasonic signal for the diagnosis.

An advantageous further development of the method of the invention provides that, during the diagnostic phase, the electromechanical ultrasonic transducer elements of the second ultrasonic sensor which are to be active in the following measuring phase are selected according to the largest signal strength of the received ultrasonic signals.

The ultrasonic transducer element or the ultrasonic transducer elements with the largest received signal strength are selected. A variant involves selecting the ultrasonic transducer element which receives the greatest signal strength. Since, however, many ultrasonic transducer elements can be combined for both transmission and/or for reception of ultrasonic signals, it is very advantageous to combine a number of ultrasonic transducer elements, especially the selected ultrasonic transducer element and its direct neighbors and/or other adjoining ultrasonic transducer elements.

Especially advantageously, the ultrasonic sensors have, in each case, matching layers between the coupling elements and ultrasonic transducer elements, which, like a filter, are embodied in such a manner, that the parts of the ultrasonic-measuring signals, which are oriented in the incidence or emergence direction of the ultrasonic measuring signals, pass the matching layers approximately undisturbed, while the parts of the ultrasonic-measuring signals, which are oriented transversely to the incidence and/or emergence direction are largely attenuated by the matching layers.

A very advantageous further development of the solution of the invention is to be seen in the fact that the first ultrasonic sensor has at least two electromechanical ultrasonic transducer elements, and during the diagnostic phase, the electromechanical ultrasonic transducer elements of the first ultrasonic sensor which are to be active in a following measuring phase are selected.

The selection occurs, for example, on the basis of the signal strength of the ultrasonic signals of the first sensor received by the second ultrasonic sensor and/or the signal strength of the ultrasonic signals received by the first ultrasonic sensor, which were transmitted from the second ultrasonic sensor.

In an advantageous embodiment of the invention, during the diagnostic phase, the electromechanical ultrasonic transducer elements of the second ultrasonic sensor which are to be active in the following measuring phase are selected according to the optimal phase difference between the transmission and reception of the received ultrasonic signals.

In an additional advantageous embodiment of the invention, during the diagnostic phase, the electromechanical ultrasonic transducer elements of the second ultrasonic sensor which are to be active in the following measuring phase are selected according to the optimal phase difference between the ultrasonic signal received by the second ultrasonic sensor and the ultrasonic signal received by the first ultrasonic sensor.

The ultrasonic signal, which is transmitted from the first ultrasonic sensor and is received by the second ultrasonic sensor has, in such case, at least one directional component in or counter to the principal flow direction of the measured medium in the measuring tube, and the ultrasonic signal which is transmitted from the second ultrasonic sensor and is received by the first ultrasonic sensor is the opposite of this. Utilized in such case, is the fact that, through the flow of the measured medium, phase differences in certain temporal sections of the two ultrasonic signals occur, in and counter to the flow direction.

In an additional advantageous embodiment of the invention, during the diagnostic phase, the electromechanical ultrasonic transducer elements of the second ultrasonic sensor which are to be active in the following measuring phase are selected according to the optimal transfer function of the received ultrasonic signals.

In an additional advantageous further development of the solution of the invention, a number of electromechanical ultrasonic transducer elements of the first ultrasonic sensor are activated simultaneously and/or a number of electromechanical ultrasonic transducer elements of the second ultrasonic sensor are activated simultaneously. This is especially advantageous in the case of ultrasonic transducer elements lying directly next to one another.

In an additional advantageous form of embodiment of the method of the invention, the particular electromechanical ultrasonic transducer elements currently active are switched between by at least one multiplexer, wherein the multiplexer is controlled by the control/evaluation unit, and wherein the electromechanical ultrasonic transducer elements of the first ultrasonic sensor and the electromechanical ultrasonic transducer elements of the second ultrasonic sensor are connected with the control/evaluation unit. Besides the known selective switching circuit for selection of a single signal, a multiplexer is, in such case, also a switch unit composed of a plurality of individual switches which are controllable independently of one another.

An advantageous form of embodiment of the method of the invention is based on the fact that the process variable registered during the diagnostic phase is stored, and that during the measuring phase, the process variable is compared with the currently registered process variable; wherein, in the case of exceeding a particular deviation of the stored process variable from the currently registered process variable, a new diagnostic phase is introduced. The comparison is possible with one and/or with a plurality of registered process variables. The calculating of the flow can, for example, occur by means of the phase shift from transmitter to receiver, in and counter to the flow direction, respectively; while the optimal combination of ultrasonic transducer elements is ascertained by means of the signal strength. As above described, the combination of ultrasonic transducer elements can, however, also be ascertained with the phase shift.

Additionally, the object of the invention is achieved by a measuring system for determining and/or monitoring the flow of a measured medium through a measuring tube with a first ultrasonic sensor and at least one second ultrasonic sensor, wherein the first ultrasonic sensor has at least one electromechanical ultrasonic transducer element, and is placeable in a first region of the measuring tube, and wherein the second ultrasonic sensor has at least two electromechanical ultrasonic transducer elements, and is placeable in a second region of the measuring tube in such a manner, that the ultrasonic signals transmittable through the measured medium from the first ultrasonic sensor are receivable by the second ultrasonic sensor, and that the ultrasonic signals transmittable through the measured medium from the second ultrasonic sensor are receivable by the first ultrasonic sensor, and with at least one control/evaluation unit, which, on the basis of the ultrasonic measuring signals, or on the basis of measurement data, which are derived from the ultrasonic measuring signals, ascertains volume flow and/or mass flow of the measured medium flowing in the measuring tube by means of a travel-time difference method; wherein, during a diagnostic phase, ultrasonic signals are transmittable from the first ultrasonic sensor through the measured medium to the second ultrasonic sensor, and at least one process variable is ascertainable and/or derivable from the receivable ultrasonic signals for each electromechanical ultrasonic transducer element of the second ultrasonic sensor, and the electromechanical ultrasonic transducer elements of the second ultrasonic sensor which are to be active in a following measuring phase are selectable based on the process variable of the receivable ultrasonic signals.

In such case, the ultrasonic transducer elements are operated by the control/evaluation unit. In the case of a plurality of ultrasonic transducer elements on an ultrasonic sensor, the signals are, for example, conveyed via at least one multiplexer. This multiplexer is then likewise controlled by the control/evaluation unit.

In an advantageous further development of the measuring system of the invention, the first ultrasonic sensor has at least two electromechanical ultrasonic transducer elements, and, during the diagnostic phase, the electromechanical ultrasonic transducer elements of the first ultrasonic sensor which are to be active in a following measuring phase are selectable.

A very advantageous further development of the measuring system of the invention is to be seen in the fact that the measuring signals of the electromechanical ultrasonic transducer elements or the measurement data derivable from the measurement signals are evaluatable by exactly one control/evaluation unit, wherein the active electromechanical ultrasonic transducer elements are controllable by the control/evaluation unit by means of at least one multiplexer.

The circuit of the active ultrasonic transducer elements is controllable by at least one multiplexer. The control/evaluation unit, which receives and processes the signals of the ultrasonic transducer elements, controls the multiplexer. The combining of the active ultrasonic transducer elements is obtained according to the method described as follows. The individual ultrasonic transducer elements transmit a predetermined signal, one after the other. The registered process parameters are evaluated, and the control/evaluation unit decides on the basis of the fixed criteria which combination of ultrasonic transducer elements is activated in the measuring phase. Besides the known selective switching circuit for selection of a single signal, a multiplexer, is, in such case, also a switch unit composed of a plurality of individual switches, which are controllable independently of one another.

In an advantageous embodiment of the invention, the first ultrasonic sensor and the second ultrasonic sensor are connectable with one another via a releasable connection.

In an additional advantageous embodiment of the invention, the first ultrasonic sensor and the second ultrasonic sensor have a common housing. In this way, only the housing is aligned parallel to the tube axis and perpendicularly over the tube center. The housing can, in such case, correspond to a defined housing protection type, e.g. it is dust, gas and/or water resistant. Additionally, the housing can have no external, movable parts.

In an additional advantageous embodiment of the invention, the second coupling element is an integral component of the first coupling element. Both ultrasonic sensors thus make use of a single, monolithic coupling element.

An advantageous further development of the measuring system of the invention provides that the electromechanical ultrasonic transducer elements of the first ultrasonic sensor each have a first area for transmitting and/or receiving ultrasonic signals, wherein the first areas have a first areal content, and wherein the electromechanical ultrasonic transducer elements of the second ultrasonic sensor each have a second area for transmitting and/or receiving ultrasonic signals, wherein the second areas have a second areal content, wherein the first areal content is unequal to the second areal content. Thus, a number of electromechanical ultrasonic transducer elements of the second ultrasonic sensor taken together form, for example, the area of an electromechanical ultrasonic transducer element of the first ultrasonic sensor. The sizes of the areas of the electromechanical ultrasonic transducer elements of the first ultrasonic sensor and those of the electromechanical ultrasonic transducer elements of the second ultrasonic sensor thus form a ratio not equal to one. Preferred ratios of the areas are, for example, nine to ten or nineteen to twenty, etc.

Another advantageous further development of the measuring system of the invention provides that the electromechanical ultrasonic transducer elements of the first ultrasonic sensor have approximately constant first distances from one another and that the electromechanical ultrasonic transducer elements of the second ultrasonic sensor have approximately constant second distances from one another, wherein the first distances are unequal to the second distances.

In such case, the distances are usually measured on the basis of the areal center points of the ultrasonic transducer elements. "Areal center point" refers in this connection to the geographical centers, or also to the centers of gravity of the areas. Of importance is less so the calculating of the areal center point as such, but rather more that the areal center points for all ultrasonic transducer elements are calculated in an equal manner. In such case, the first distances of the electromechanical ultrasonic transducer elements of the first ultrasonic sensor from one another and the second distances of the electromechanical ultrasonic transducer elements of the second ultrasonic from one another sensor are in a ratio not equal to one relative to one another. Preferred ratios are, for example, nine to ten or nineteen to twenty, etc.

With the aforementioned ratios, a division modeled on a vernier is achieved. Through the many possibilities for combining active ultrasonic transducer elements, the most varied of distances between these is implementable. Thus, small changes of process parameters can also be compensated for, which, in the state of the art, would lead to a signal quality loss or make necessary a new adjustment of the sensors with respect to one another.

In a very advantageous further development of the invention, a number of electromechanical ultrasonic transducer elements are simultaneously activatable.

A plurality of electromechanical ultrasonic transducer elements, especially which lie next to one another, are then simultaneously activatable; that is, they are ready to transmit and/or receive.

In an advantageous further development of the measuring system of the invention, it is provided that the first ultrasonic sensor has a coupling element, which is embodied in such manner, that an ultrasonic signal transmitted by the electromechanical ultrasonic transducer element has a directional component in or counter to the principal flow direction of the measured medium in the measuring tube, and/or that the second ultrasonic sensor has a coupling element, which is embodied in such a manner, that an ultrasonic signal transmitted by the electromechanical ultrasonic transducer element has a directional component in or counter to the principal flow direction of the measured medium in the measuring tube.

An advantageous embodiment of the invention provides that the electromechanical ultrasonic transducer elements of the first ultrasonic sensor and/or of the second ultrasonic sensor which are active in the measuring phase are externally selectable, that is from an external unit, e.g. are settable by the user via a corresponding interface or from an external field device, via an analog frequency or electrical current input, electromechanically via switch or digitally via a signal.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
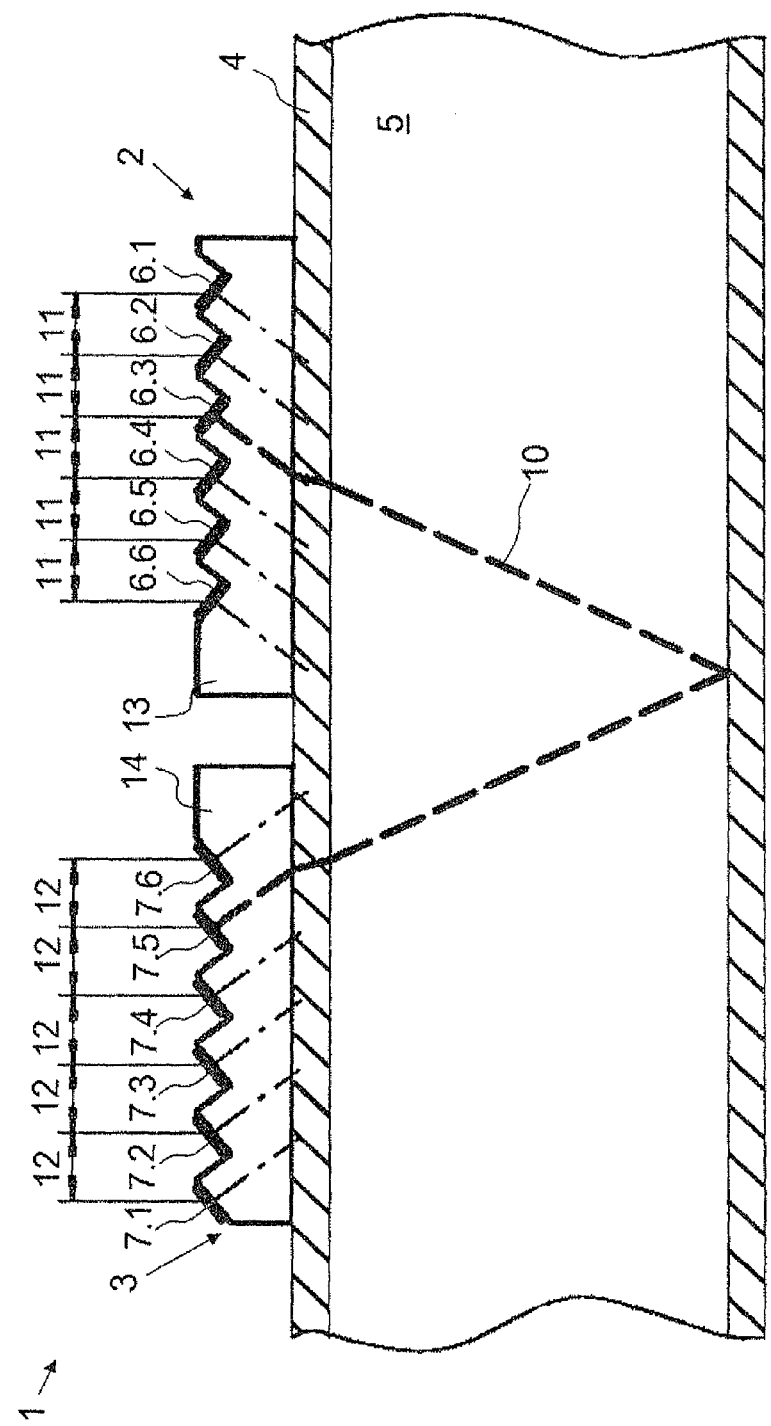
FIG. 1 in longitudinal section, a measuring tube with the measuring system of the invention.

FIG. 1 shows a measuring system of the invention 1 with two ultrasonic sensors 2, 3, which are placed on a measuring tube 4. Both ultrasonic sensors 2, 3 make use of a plurality of ultrasonic transducer elements 6.1-6.6, 7.1-7.6. The system thus concerns a so-called transducer array, not to be confused with arrays in individual sensors. With a single combination of individually operable ultrasonic transducer elements 6.1-6.6, 7.1-7.6, the flow measurement can be performed. The selection and positioning of the sensors 2, 3 is facilitated by the large number of possibilities for combinations.

The ultrasonic sensors 2, 3 are placed on the same outer side of the measuring tube 4. Their ultrasonic transducer elements 6.1-6.6, 7.1-7.6 are angularly arranged relative to one another that the ultrasonic signals 10 radiated by them through the measured medium 5 arrive the other ultrasonic sensor 2, 3. A directional component of an ultrasonic signal 10 points, in such case, in the direction of the principal flow direction of the measured medium 5 in the measuring tube 4. Thus, in the case of mutual transmitting and receiving, a travel-time difference can be measured, via which the flow velocity of the measured medium 5 in the measuring tube 4, and therewith the flow, can be ascertained.

The ultrasonic transducer elements 6.1-6.6 have, in such case, a distance 11 from one another. The ultrasonic transducer elements 7.1-7.6 have, in contrast, a distance 12 from one another. The distances 11, 12 are considered, in such case, approximately constant; however, they not equal. In this example of an embodiment, the distances 11 are 10 mm and the distances 12 are 9 mm.

The diagnostic phase of the measuring system 1 is preceded by the construction of the measuring system 1. First, the clamp-on ultrasonic sensors 2, 3 are secured onto the outside of the measuring tube 4. Thereafter, the measuring system 1 is turned on, and the start of operation follows.

During the diagnostic phase, the ultrasonic transducer elements 6.1-6.6 are turned on, or activated, one after the other, and are excited to transmit a predeterminable ultrasonic signal. In such case, for example, the signal strength of the received ultrasonic signals is individually measured for each ultrasonic transducer element 7.1-7.6. This can occur both sequentially in time, i.e. through sequential measuring of all possible combinations, as well as also simultaneously. All ultrasonic transducer elements 7.1-7.6 are, so-to-speak, in reception mode, while a particular ultrasonic transducer element 6.1-6.6 transmits. With the illustrated embodiment of the measuring system 1 of the invention, however, only sequential measuring is possible.

Thereafter, the same procedure can be repeated in the other direction, i.e. the ultrasonic transducer elements 7.1-7.6 transmit, and the ultrasonic transducer elements 6.1-6.6 receive. The optimum pair, which, for example, assures the maximum signal strength, is selected for the measuring. The measured process parameters are stored. During the measuring phase, only the selected ultrasonic transducer elements 6.1-6.6, 7.1-7.6 are activated to ascertain the flow. At the same time, the other ultrasonic transducer elements 6.1-6.6, 7.1-7.6 can furthermore be excited, e.g. with a frequency essentially different from the measuring frequency. Thus, during the measuring phase, further changes in the measuring conditions can be looked for, which could make necessary a change of the optimal ultrasonic transducer elements pair. Such a change in measurement conditions can, for example, be recognized in that the stored process parameters deviate from the measured parameters in a certain way, e.g. by falling under or exceeding a threshold value, or in that another pair of ultrasonic transducer elements 6.1-6.6, 7.1-7.6 delivers process parameters, for example, a higher signal strength. The diagnosis can, however, also take place separated in time from the measuring phase.

The information concerning the running measuring and/or diagnostic phases and/or their results or findings can also be displayed—for example on a visual display—or an alarm signal can be output, when measuring conditions change.

Figure 2:
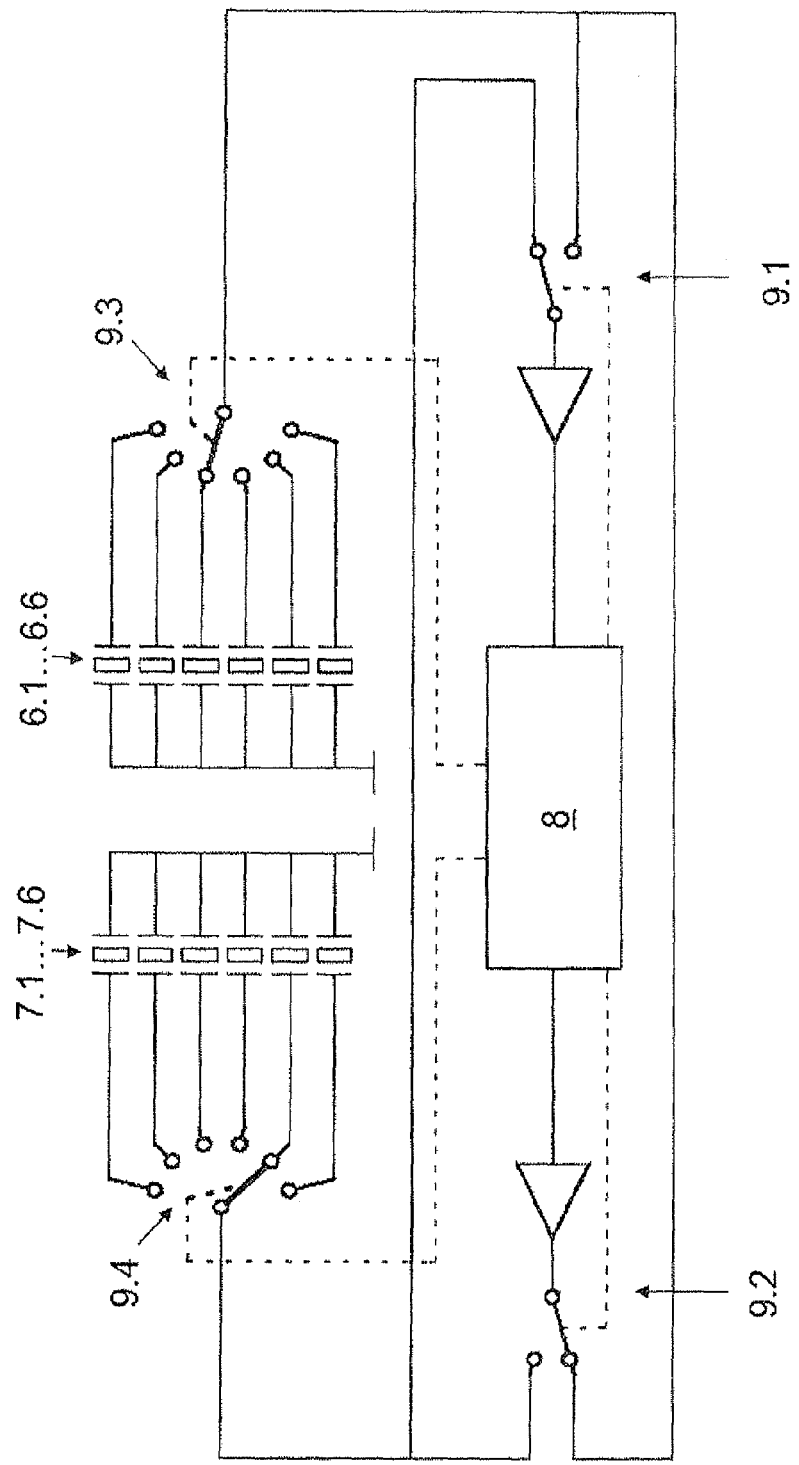
FIG. 2 a distributor circuit of the invention.

As shown in FIG. 2, the ultrasonic sensors 2, 3 are, in such case, connected with multiplexers 9.1-9.4, which, in each case, activate two ultrasonic transducer elements 6.1-6.6, 7.1-7.6, one as transmitter and the other as receiver. The multiplexers 9.1-9.4 are controlled by the control/evaluation unit 8.

The ultrasonic transducer elements 6.1-6.6, 7.1-7.6 are only schematically drawn in FIG. 2. In each case, only one combination—i.e. a pair—of ultrasonic transducer elements 6.1-6.6, 7.1-7.6 is activated, i.e. only one ultrasonic transducer element 6.1-6.6 transmits, and one ultrasonic transducer element 7.1-7.6 receives, and/or vice versa. The advantage lies in the small amount of data to be processed. The control/evaluation unit 8 must always process only one signal. The control of the multiplexer 9.1-9.4 is likewise assumed by the control/evaluation unit 8. The operating of the individual ultrasonic transducer elements 6.1-6.6, 7.1-7.6 occurs via the multiplexer 9.1-9.4, albeit very rapidly. In this way, this system 1 has a very low susceptibility to error, is cost effective and is nevertheless highly accurate and rapid.

Figure 5:
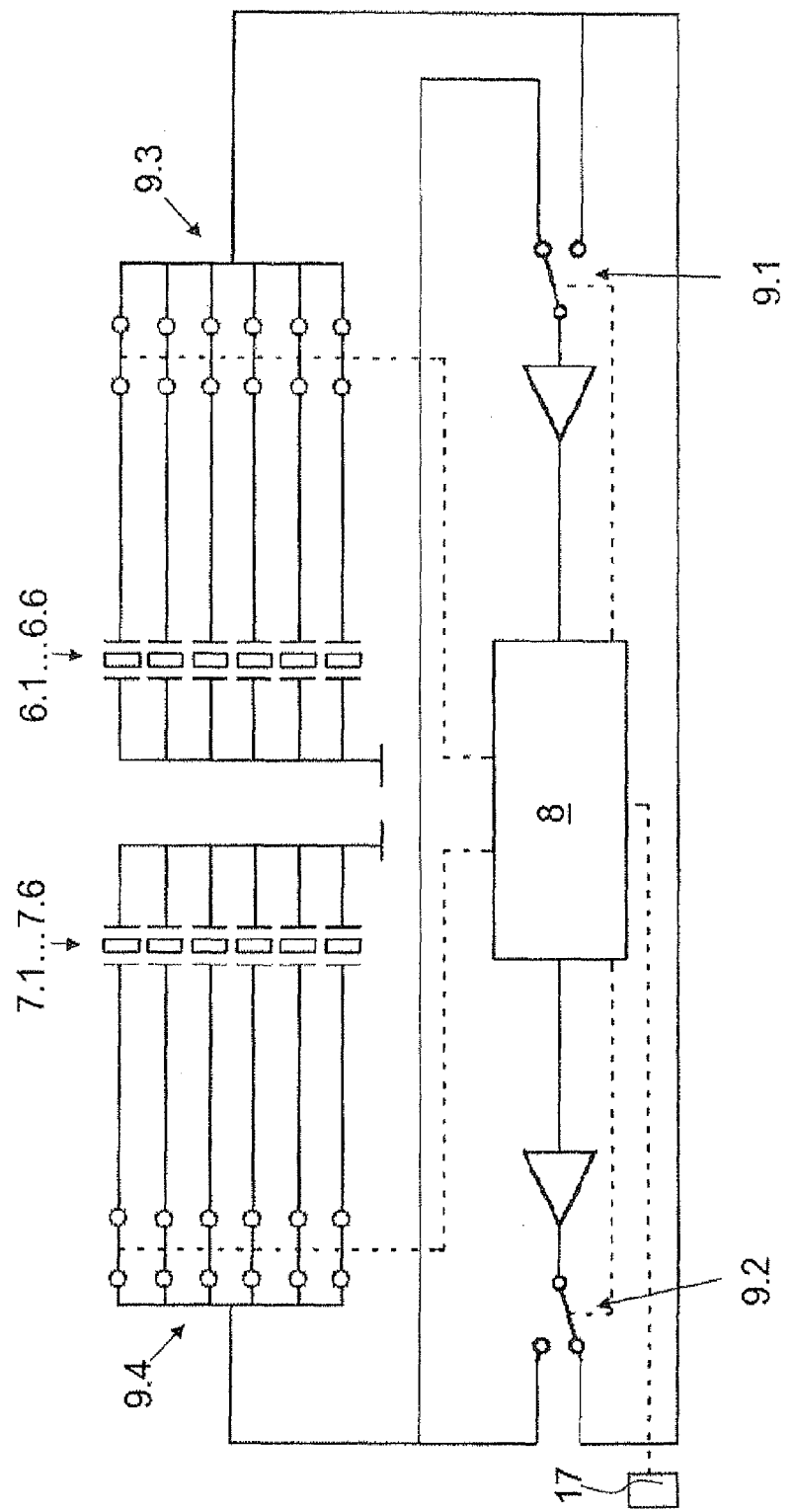
FIG. 5 another distributor circuit of the invention.

In order to activate a number of ultrasonic transducer elements 6.1-6.6, 7.1-7.6 simultaneously, at least one of the illustrated multiplexers 9.3, 9.4 would have to be replaced by a plurality of individually controllable switches, as shown in FIG. 5. The term "multiplexer" is generally meant here to refer to a switching unit composed of a plurality of individual switches, which are controllable independently of one another. Additionally, this circuit has available an interface 17. This is for communication with a control unit—e.g. for connection with a bus—or a human-machine-interface.

Figure 3:
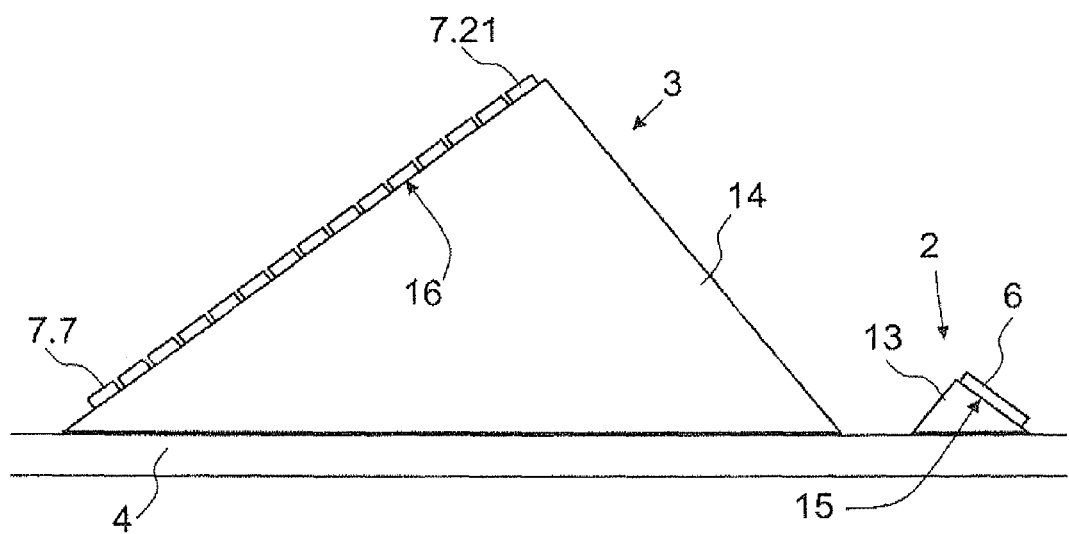
FIG. 3 in longitudinal section, two ultrasonic sensors of a measuring system of the invention.

FIG. 3 discloses a measuring system 1 of the invention with two ultrasonic sensors 2, 3, which stand facing one another and which are secured on the same side of the measuring tube 4. Here, the coupling elements 13, 14 also have an angle between the ultrasonic transducer elements 6, 7.7-7.21 and the measuring tube 4, so that the ultrasonic signals (not shown here for reasons of perspicuity) have a directional component in the principal flow direction of the measured medium in the measuring tube 4.

During the diagnostic phase, the ultrasonic transducer 2 transmits ultrasonic signals to the ultrasonic transducer 3 and vice versa. Here, for reasons of simplicity, only the first case is considered. The signal strengths received by the ultrasonic transducer elements 7.7-7.21 and/or other process parameters are compared with one another, and the ultrasonic transducer element 7.7-7.21 having process parameters most suitable for the measuring is selected for the measuring, and thus the signal path for the measuring is set. However, the combination of a plurality of elements 7.7-7.21 lying next to one another is also an option.

In the case of the illustrated measuring system, the ultrasonic transducers 2, 3 make use of differently sized ultrasonic transducer elements 6, 7.7-7.21. The approximately square-shaped, ultrasonic transducer element 6 measures, for example, 8×8 mm, while the size of the ultrasonic transducer elements 7.7-7.21 amounts to, in each case, 2×8 mm. In order to obtain the same area as the ultrasonic transducer element 6, four ultrasonic transducer elements 7.7-7.21, which lie next to one another, are activated together. This usually happens with the direct neighbors of the ultrasonic transducer element 7.7-7.21 with the most suitable process parameters. The combination can be valid for transmitting and receiving, as well as also take place separately from one another. Combined ultrasonic transducer elements 7.7-7.21 can transmit when they are operated simultaneously. This is effected again via correspondingly embodied multiplexers 9 (not shown here).

Figure 4:
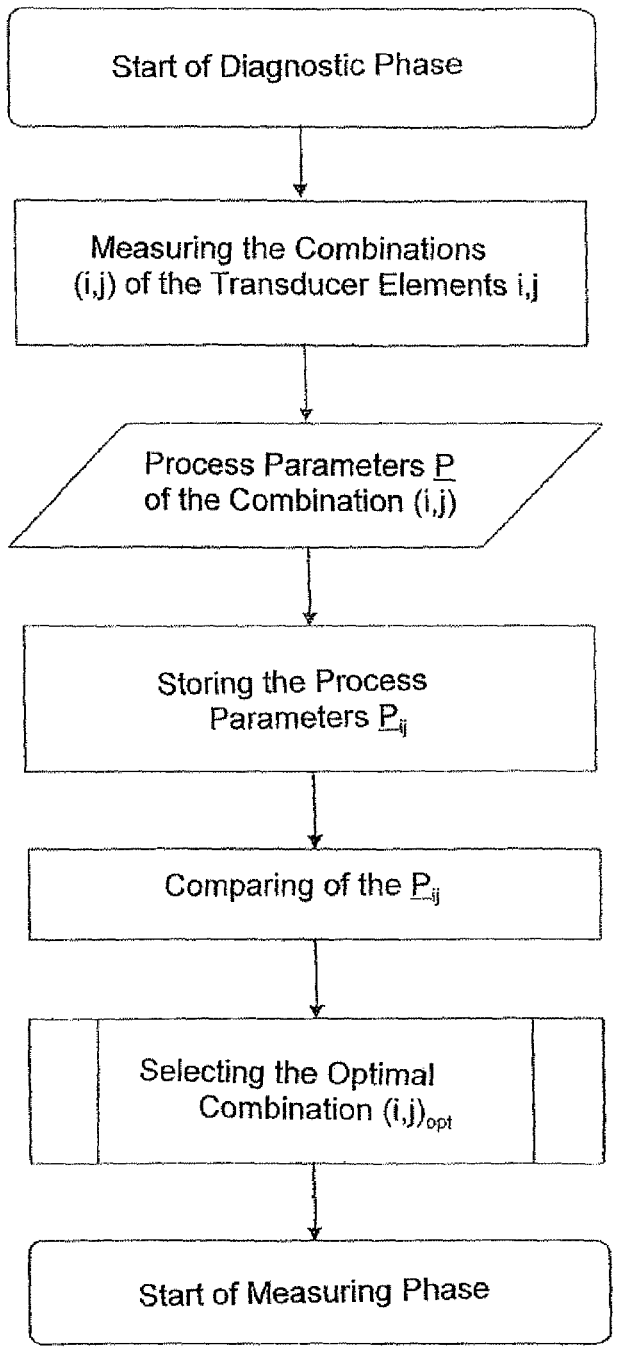
FIG. 4 a flow diagram of the method of the invention.

FIG. 4 shows a flow diagram of the described method. The diagnostic phase is preceded by installation and rough positioning of the ultrasonic sensors 2, 3. To match FIG. 1, the transducer elements of the first ultrasonic sensor 2 would have to be referred to with 6.$i$, and the transducer elements of the second ultrasonic sensor with 7.$j$. For reasons of simplicity, they are referred to in FIG. 4 only with i and j. The combination (i,j)—which, in keeping with FIG. 1, would be (6.$i$,7.$j$)—is measured, i.e. the process parameters $P_{ij}$ are ascertained and/or derived. These are then stored. This occurs for all combinations from i=1 through i=$i_{max}$ and j=1 through j=$j_{max}$. The comparison of the process parameters $P_{ij}$ for all combinations delivers the most suitable combination of ultrasonic transducer elements. With these, the measuring is carried out.

Naturally, a different procedure from the one presented here is thinkable, in which the currently measured process variables are compared with those process variables stored in the memory which, up to now, have been most suitable.

The measuring can then from time to time, e.g. in a time- and/or user- and/or process-controlled manner, again be interrupted by diagnostic phases. Alternatively, the diagnosis can take place during the measuring phase and/or through evaluation of the measuring signals themselves.

LIST OF REFERENCE CHARACTERS 1 flow measuring system
2 first ultrasonic sensor
3 second ultrasonic sensor
4 measuring tube
5 measured medium
6 electromechanical ultrasonic transducer elements
7 electromechanical ultrasonic transducer elements
8 control/evaluation unit
9 multiplexer
10 ultrasonic signal path
11 distance of the electromechanical ultrasonic transducer elements from one another
12 distance of the electromechanical ultrasonic transducer elements from one another
13 coupling element
14 coupling element
15 first area
16 second area
17 external interface

The invention claimed is:
1. A method for determining and/or monitoring flow of a measured medium through a measuring tube with a first ultrasonic sensor and at least a second ultrasonic sensor, wherein the first ultrasonic sensor has at least one electromechanical ultrasonic transducer element, and the second ultrasonic sensor has at least two electromechanical ultrasonic transducer elements, the method comprising the steps of:
  placing the first ultrasonic sensor in a first region of the measuring tube;
  placing the second ultrasonic sensor in a second region of the measuring tube in such a manner that ultrasonic signals transmitted through the measured medium from the first ultrasonic sensor are received by the second ultrasonic sensor, and that the ultrasonic signals transmitted through the measured medium from the second ultrasonic sensor are received by the first ultrasonic sensor;
  ascertaining volume flow and/or mass flow of the measured medium flowing in the measuring tube using at least one control/evaluation unit, which, ascertainment is based on ultrasonic measuring signals, or based on measurement data, which are derived from the ultrasonic measuring signals by means of a travel-time difference method;
  during a diagnostic phase, ultrasonic signals are transmitted from the first ultrasonic sensor through the measured medium to the second ultrasonic sensor;
  at least one process variable is ascertained and/or derived from received ultrasonic signals for each electromechanical ultrasonic transducer element of the second ultrasonic sensor; and
  the electromechanical ultrasonic transducer elements of the second ultrasonic sensor, which are to be active in a following measuring phase, are selected based on the process variable of the received ultrasonic signals.

2. The method as claimed in claim 1, wherein:
the electromechanical ultrasonic transducer elements of the second ultrasonic sensor, which are to be active in the following measuring phase, are selected during the diagnostic phase according to the highest signal strength of the received ultrasonic signals.

3. The method as claimed in claim 1, wherein:
the first ultrasonic sensor has at least two electromechanical ultrasonic transducer elements; and
the electromechanical ultrasonic transducer elements of the first ultrasonic sensor, which are to be active in a following measuring phase, are selected during the diagnostic phase.

4. The method as claimed in claim 1, wherein:
a plurality of electromechanical ultrasonic transducer elements of the first ultrasonic sensor are activated simultaneously and/or a plurality of electromechanical ultrasonic transducer elements of the second ultrasonic sensor are activated simultaneously.

5. The method as claimed in claim 1, wherein:
the electromechanical ultrasonic transducer elements currently active are switched by at least one multiplexer;
the multiplexer is controlled by the control/evaluation unit; and
the electromechanical ultrasonic transducer elements of the first ultrasonic sensor and the electromechanical ultrasonic transducer elements of the second ultrasonic sensor are connected with the control/evaluation unit.

6. The method as claimed in claim 1, wherein:
the process variable registered during the diagnostic phase is stored, and, during the measuring phase, the stored process variable is compared with the currently registered process variable; and
in the case of exceeding a particular deviation of the stored process variable from the currently registered process variable, a new diagnostic phase is introduced.

7. A measuring system for determining and/or monitoring flow of a measured medium through a measuring tube comprising:
a first ultrasonic sensor;
at least a second ultrasonic sensor; and
at least one control/evaluation unit, wherein:
said first ultrasonic sensor has at least one electromechanical ultrasonic transducer element and is placeable in a first region of the measuring tube;
said second ultrasonic sensor has at least two electromechanical ultrasonic transducer elements and is placeable in a second region of the measuring tube in such a manner, that ultrasonic signals transmittable through the measured medium from said first ultrasonic sensor are receivable by said second ultrasonic sensor;
the ultrasonic signals transmittable through the measured medium from said second ultrasonic sensor are receivable by said first ultrasonic sensor;
with said at least one control/evaluation unit, which, based on the ultrasonic-measuring signals, or based on measurement data, which are derived from the ultrasonic measuring signals, ascertains volume flow and/or mass flow of the measured medium flowing in the measuring tube by means of a travel-time difference method;
during a diagnostic phase, ultrasonic signals are transmittable from said first ultrasonic sensor through the measured medium to said second ultrasonic sensor;
at least one process variable is ascertainable and/or derivable from the receivable ultrasonic signals for each electromechanical ultrasonic transducer element of said second ultrasonic sensor; and
said electromechanical ultrasonic transducer elements of said second ultrasonic sensor, which are to be active in a following measuring phase, are selectable based on the process variable of the receivable ultrasonic signals.

8. The measuring system as claimed in claim 7, wherein:
said first ultrasonic sensor has at least two electromechanical ultrasonic transducer elements; and
said electromechanical ultrasonic transducer elements of said first ultrasonic sensor, which are to be active in a following measuring phase, are selectable during the diagnostic phase.

9. The measuring system as claimed in claim 7, wherein:
the measuring signals of said electromechanical ultrasonic transducer elements or the measurement data derivable from the measurement signals are evaluatable by exactly one control/evaluation unit; and
said active electromechanical ultrasonic transducer elements are controllable by said control/evaluation unit by means of at least one multiplexer.

10. The measuring system as claimed in claim 7, wherein:
said electromechanical ultrasonic transducer elements of said first ultrasonic sensor each have a first area for transmitting and/or receiving ultrasonic signals;
said first area has a first areal content;
said electromechanical ultrasonic transducer elements of said second ultrasonic sensor each have a second area for transmitting and/or receiving ultrasonic signals;
said second area has a second areal content; and
said first areal content is unequal to said second areal content.

11. The measuring system as claimed in claim 8, wherein:
said electromechanical ultrasonic transducer elements of said first ultrasonic sensor have approximately constant first distances from one another;
said electromechanical ultrasonic transducer elements of said second ultrasonic sensor have approximately constant second distances from one another; and
said first distances are unequal to said second distances.

12. The measuring system as claimed in claim 7, wherein:
a plurality of electromechanical ultrasonic transducer elements are activatable simultaneously.

13. The measuring system as claimed in claim 7, wherein:
said first ultrasonic sensor has a coupling element, which is embodied in such a manner, that an ultrasonic signal transmitted by said electromechanical ultrasonic transducer element has a directional component in or counter to the principal flow direction of the measured medium in the measuring tube, and/or
said second ultrasonic sensor has a coupling element, which is embodied in such a manner, that an ultrasonic signal transmitted by said electromechanical ultrasonic transducer element has a directional component in or counter to the principal flow direction of the measured medium in the measuring tube.

* * * * *